US012565342B2

(12) United States Patent
Arase

(10) Patent No.: US 12,565,342 B2
(45) Date of Patent: Mar. 3, 2026

(54) UNMANNED AIRCRAFT

(71) Applicant: ARASE AIZAWA AEROSPATIALE LLC, Hamamatsu (JP)

(72) Inventor: Kunio Arase, Hamamatsu (JP)

(73) Assignee: ARASE AIZAWA AEROSPATIALE LLC, Shizuoka (JP)

( * ) Notice: Subject to any disclaimer, the term of this patent is extended or adjusted under 35 U.S.C. 154(b) by 0 days.

(21) Appl. No.: 18/861,772

(22) PCT Filed: May 15, 2023

(86) PCT No.: PCT/JP2023/018179
§ 371 (c)(1),
(2) Date: Oct. 30, 2024

(87) PCT Pub. No.: WO2023/224018
PCT Pub. Date: Nov. 23, 2023

(65) Prior Publication Data
US 2025/0296710 A1 Sep. 25, 2025

(30) Foreign Application Priority Data
May 16, 2022 (JP) ................................. 2022-080510

(51) Int. Cl.
B64U 10/14 (2023.01)
B64U 30/293 (2023.01)
(52) U.S. Cl.
CPC ........... B64U 10/14 (2023.01); B64U 30/293 (2023.01)
(58) Field of Classification Search
CPC ....... B64U 10/14; B64U 30/293; B64C 11/28; B64C 27/50
See application file for complete search history.

(56) References Cited

U.S. PATENT DOCUMENTS 3,053,480 A * 9/1962 Vanderlip ............... B64C 27/54
244/17.13
3,185,410 A * 5/1965 Smart ..................... B64C 27/08
244/17.23
(Continued)

FOREIGN PATENT DOCUMENTS

CN 201793017 U 4/2011
JP 2018-516197 A 6/2018
(Continued)

OTHER PUBLICATIONS

International Search Report and Written Opinion received for PCT/JP2023/018179, mailed Aug. 1, 2023.

*Primary Examiner* — Medhat Badawi
(74) *Attorney, Agent, or Firm* — Greer, Burns & Crain, Ltd

(57) ABSTRACT

An unmanned aircraft which has uniform lift and the overall airframe dimensions of which can be made small is disclosed. This unmanned aircraft is provided with four propeller shafts jutting horizontally along diagonals from the airframe, and four propellers constituted from twin blades having folding mechanisms. Engine rotation is transmitted to the propellers by gears. The unmanned aircraft features that all of the propellers are at the same height from the tip end of the propeller shafts; the rotational ranges overlap those of the neighboring propellers; the mounting angles are set 90 degrees off from those of the neighboring propellers; and the rotational directions are mutually opposite from those of the neighboring propellers.

1 Claim, 4 Drawing Sheets

(56)  References Cited

U.S. PATENT DOCUMENTS

| | | | | | |
|---|---|---|---|---|---|
| 3,762,667 | A | * | 10/1973 | Pender | B64C 29/0033 |
| | | | | | 244/17.19 |
| 3,762,669 | A | * | 10/1973 | Curci | B64C 27/14 |
| | | | | | 416/111 |
| 4,252,504 | A | * | 2/1981 | Covington | B64C 27/50 |
| | | | | | 416/221 |
| 4,874,291 | A | * | 10/1989 | Roberts | B64C 27/08 |
| | | | | | 416/19 |
| 9,957,045 | B1 | * | 5/2018 | Daly | B64U 50/19 |
| 10,343,770 | B2 | * | 7/2019 | Mullins | B64C 27/08 |
| 10,543,915 | B2 | * | 1/2020 | Goldstein | B64U 10/13 |
| 10,549,850 | B1 | * | 2/2020 | Ryan | B64U 20/50 |
| 10,669,869 | B1 | * | 6/2020 | Urban | B64C 11/28 |
| 10,994,829 | B2 | * | 5/2021 | Duffy | B64C 29/0025 |
| 11,117,649 | B2 | * | 9/2021 | Alley | B64C 11/28 |
| 11,535,369 | B2 | * | 12/2022 | Goldstein | B64C 11/28 |
| 11,565,790 | B2 | * | 1/2023 | Schiller | B64C 11/50 |
| 12,098,696 | B2 | * | 9/2024 | Bucheru | B64C 11/50 |
| 12,168,510 | B2 | * | 12/2024 | Kowald | B64U 50/19 |
| 12,221,208 | B2 | * | 2/2025 | Goldstein | B64U 10/13 |
| 12,221,217 | B2 | * | 2/2025 | Obrist | B64C 27/08 |
| 2002/0081201 | A1 | * | 6/2002 | Mondet | B64C 27/50 |
| | | | | | 416/143 |
| 2002/0104922 | A1 | * | 8/2002 | Nakamura | B64U 30/20 |
| | | | | | 244/17.25 |
| 2006/0054737 | A1 | * | 3/2006 | Richardson | B64C 27/24 |
| | | | | | 244/17.11 |
| 2007/0158494 | A1 | * | 7/2007 | Burrage | B64C 39/04 |
| | | | | | 244/7 R |

| | | | | |
|---|---|---|---|---|
| 2016/0179096 | A1 | * | 6/2016 | Bradlow | B64C 19/00 |
| | | | | | 701/8 |
| 2016/0244162 | A1 | * | 8/2016 | Weller | B64U 10/13 |
| 2017/0101176 | A1 | * | 4/2017 | Alber | B64C 3/32 |
| 2017/0174335 | A1 | * | 6/2017 | Malloy | B64D 35/021 |
| 2017/0174336 | A1 | * | 6/2017 | Baba | B64U 50/13 |
| 2017/0225794 | A1 | * | 8/2017 | Waltner | B64D 35/023 |
| 2017/0247107 | A1 | * | 8/2017 | Hauer | B64U 30/20 |
| 2017/0253326 | A1 | * | 9/2017 | Mullins | B64C 27/08 |
| 2017/0283050 | A1 | * | 10/2017 | Baek | B64C 27/48 |
| 2017/0297695 | A1 | * | 10/2017 | Schaeffer | B64C 27/46 |
| 2017/0327219 | A1 | * | 11/2017 | Alber | H02S 20/00 |
| 2018/0037311 | A1 | * | 2/2018 | Tian | B64U 50/19 |
| 2018/0178896 | A1 | * | 6/2018 | Lee | B64C 11/28 |
| 2018/0257769 | A1 | * | 9/2018 | Goldstein | B64C 27/50 |
| 2019/0256191 | A1 | * | 8/2019 | Suzuki | B64C 19/02 |
| 2019/0291856 | A1 | * | 9/2019 | Kaufman | B64C 27/14 |
| 2020/0277046 | A1 | * | 9/2020 | Goldstein | B64C 11/28 |
| 2021/0009279 | A1 | * | 1/2021 | Hauer | B64C 27/52 |
| 2021/0039784 | A1 | * | 2/2021 | Wu | B64D 1/18 |
| 2022/0126990 | A1 | * | 4/2022 | Yang | B64C 27/32 |
| 2022/0363381 | A1 | * | 11/2022 | Chan | B64U 10/14 |
| 2022/0388640 | A1 | * | 12/2022 | Ivans | B64C 27/26 |
| 2023/0303242 | A1 | * | 9/2023 | Goldstein | B64C 11/28 |
| 2024/0400238 | A1 | * | 12/2024 | Luong | B64U 20/50 |

FOREIGN PATENT DOCUMENTS

| | | |
|---|---|---|
| JP | 2020-100241 A | 12/2018 |
| WO | 2018084261 A1 | 5/2018 |

* cited by examiner

Details of Section A

UNMANNED AIRCRAFT

BACKGROUND

The present invention relates to an unmanned aerial vehicle, and more specifically, to an unmanned aerial vehicle with foldable propellers that are positioned at the same height as adjacent propellers and can rotate with overlapping rotation ranges.

An unmanned aerial vehicle is typically transported by, for example, loading it onto a truck and carrying it to an airfield. The bed of a 2-ton truck, for example, is 3.1 meters in length, 1.6 meters in width, and 0.4 meters in height. It is desirable for the dimensions of the unmanned aerial vehicle to be such that it can be loaded onto this truck. By equipping an unmanned aerial vehicle with four horizontally rotating propellers, each 1.8 meters long and arranged so that they do not overlap, the overall dimensions of the aircraft become 3.6 meters in both length and width. As a result, it cannot be loaded onto a 2-ton truck bed. By making the propellers foldable, the length of each propeller can be reduced to 0.9 meters, resulting in overall dimensions of 1.8 meters in length and width. However, it still cannot be loaded onto a truck bed that is 1.6 meters wide.

To make the unmanned aerial vehicle loadable onto a 2-ton truck, it is conceivable to reduce the overall dimensions by allowing the rotation ranges of the propellers to overlap. In that case, to prevent the propellers from colliding, the height of the propellers will be adjusted to ensure they overlap correctly. If adjacent propellers are overlapped by approximately 0.5 meters, the overall dimensions can be reduced to 0.8 meters (1.8 meters–0.5 meters×2) in length, allowing the unmanned aerial vehicle to be loaded onto a 2-ton truck bed.

Eliminating propeller collisions by creating height differences between the propellers is effective when each propeller is driven by its own motor. However, creating height differences between the propellers is not desirable from the perspective of uniform lift and stability of the unmanned aerial vehicle. In contrast, if the propellers are driven by an engine via gears, each propeller can be rotated in synchronization with the others, maintaining a constant positional relationship. This allows the propellers to be placed at the same height without causing collisions between them. Patent Document 1 (JP2020-100241A) describes an unmanned aerial vehicle equipped with an engine, where the propellers are driven by gears. This document does not describe folding the propellers or arranging them in an overlapping manner.

PRIOR-ART DOCUMENT

Patent Document

Patent Document 1: JP2020-100241A

SUMMARY

The objective of the present invention is to provide an unmanned aerial vehicle that enables uniform lift and reduces the overall dimensions of the aircraft.

An unmanned aerial vehicle according to the present invention includes four propeller shafts arranged horizontally in a diagonal direction to extend from an airframe, four propellers, each including two blades with a folding mechanism, and gears that transmit the rotation of an engine to the propellers. The four propellers are all positioned at the same height relative to each end of the respective propeller shafts, the adjacent propellers have overlapping rotational ranges, the propellers are mounted at a 90° offset mounting angle from each adjacent propeller, and the adjacent propellers rotate in opposite directions.

The folding mechanism includes a knob, a spring, a pin, and a rubber damper that surrounds the pin. Pulling the knob to release the engagement between the pin and the blade allows the blade to rotate around a rotational shaft.

The unmanned aerial vehicle according to the present invention has the following effects: (1) By positioning all four propellers at the same height, a uniform lift is achieved. (2) By providing overlapping rotational ranges for the adjacent propellers and incorporating a folding mechanism for each propeller, the overall dimensions of the aircraft are reduced, allowing it to be loaded onto a small truck and transported on public roads. (3) By driving the propellers with gears, offsetting the mounting angles of adjacent propellers by 90°, and making the rotation directions of adjacent propellers opposite, the propellers can be positioned at the same height and have overlapping rotational ranges without colliding with each other.

By providing a folding mechanism for a blade, which includes a knob, a spring, a pin, and a rubber damper surrounding the pin, manually pulling the knob releases the engagement between the pin and the blade, allowing the blade to rotate around a rotational shaft. This enables the propeller to be folded. By providing a rubber damper on the pin, the load applied to the pin when the propeller starts rotating can be mitigated.

DETAILED DESCRIPTION

Hereinafter, an unmanned aerial vehicle according to the present invention will be described in detail with reference to the accompanying drawings.

Figures 1, 2:
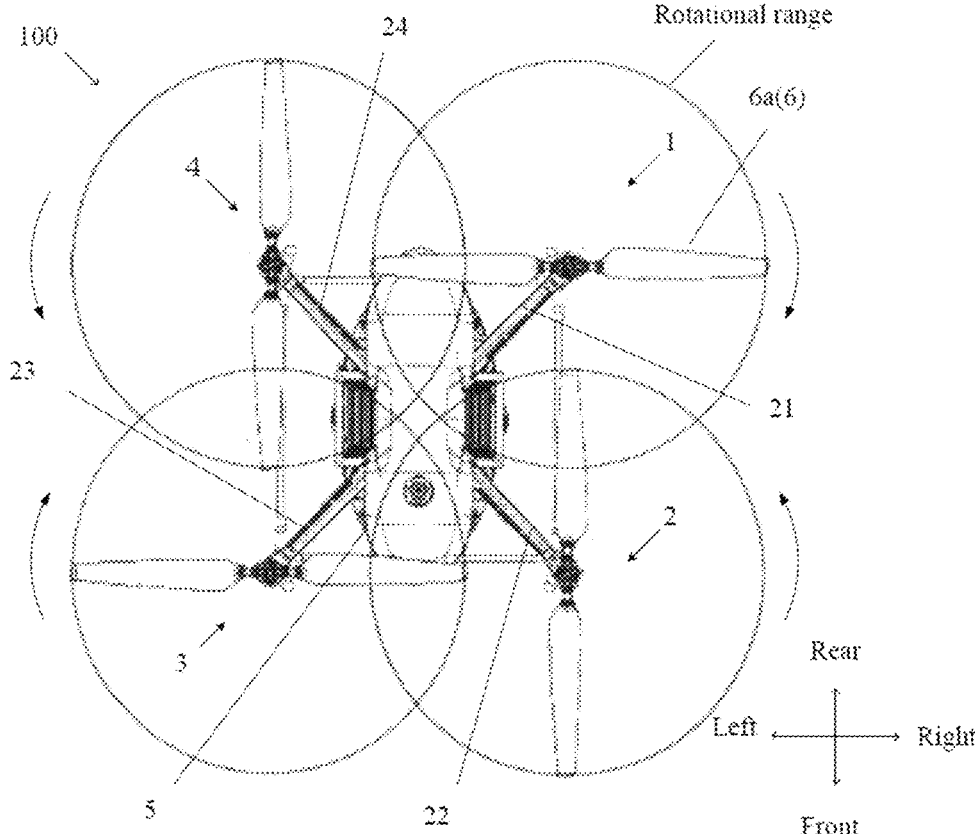
FIG. 1 is a plan view of an unmanned aerial vehicle with the propellers in rotation according to the present invention.
FIG. 2 is a plan view of an unmanned aerial vehicle with the propellers stopped according to the present invention.

FIG. 1 is a plan view of an unmanned aerial vehicle 100 with the propellers in rotation according to the present invention. The unmanned aerial vehicle 100 is equipped with four propellers 6 so as to surround an airframe 5. The four propellers 6 are referred to clockwise as a first propeller 1, a second propeller 2, a third propeller 3, and a fourth propeller 4. The airframe 5 is provided with a first propeller shaft 21, a second propeller shaft 22, a third propeller shaft 23, and a fourth propeller shaft 24, all arranged horizontally in a diagonal direction. The propellers 6 are mounted on vertical shafts provided at the ends of each propeller shaft so that they rotate horizontally. The rotational ranges of the propellers 6 are arranged to overlap with each other. The rotational range of the first propeller 1 overlaps with that of the fourth propeller 4 on the left and the second propeller 2 in the front. The rotational range of the second propeller 2 overlaps with that of the first propeller 1 in the rear and the third propeller 3 on the left. The rotational range of the third propeller 3 overlaps with that of the second propeller 2 on the right and the fourth propeller 4 in the rear. The rotational range of the fourth propeller 4 overlaps with that of the third propeller 3 in the front and the first propeller I on the right. All four propellers 6 are arranged at the same height.

FIG. 2 is a plan view of an unmanned aerial vehicle with the propellers stopped according to the present invention. Each propeller 6 consists of two blades, each referred to as blade 6a. When the propellers stop, the first propeller I and the third propeller 3 stop facing right and left, while the second propeller 2 and the fourth propeller 4 stop facing forward and backward. In this embodiment, the propellers 6 are rotated by a drive shaft 12 (described later) provided behind a clutch on an engine's crankshaft. Although the stopping position of the propellers is not always consistent when they stop, they can be manually rotated to a predetermined position after stopping. After the propellers stop, the drive shaft 12 can also be rotated to a predetermined position by a drive motor, not limited to manual adjustment. The propellers 6 are mounted at a 90° offset mounting angle from each other to prevent them from colliding.

Referring to FIG. 2. the propellers 6 are mounted so that the first propeller 1 and the third propeller 3 face right and left, while the second propeller 2 and the fourth propeller 4 face forward and backward. In this embodiment, the first propeller 1 and the third propeller 3 rotate clockwise, while the second propeller 2 and the fourth propeller 4 rotate counterclockwise. The rotation of the first propeller 1 to the fourth propeller 4 alternates between clockwise and counterclockwise: right, left, right, left. This allows the blades 6a to avoid colliding with each other in the areas where the propellers 6 overlap. Referring to FIG. 1, when the blade 6a of the first propeller 1, which is facing left in the overlapping area, rotates to the right and points backward, the blade 6a of the fourth propeller 4, which is facing forward, enters the overlapping area. Therefore, the blade 6a of the first propeller 1 and the blade 6a of the fourth propeller 4 do not collide.

Figure 3:
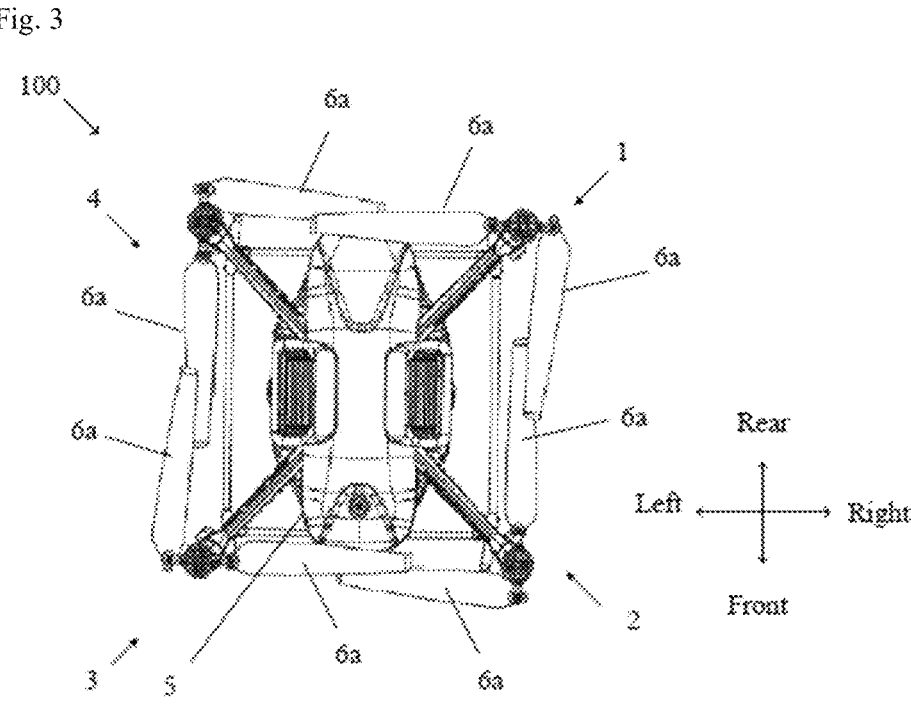
FIG. 3 is a plan view of the unmanned aerial vehicle of FIG. 2 with the propellers folded.

FIG. 3 is a plan view of the unmanned aerial vehicle of FIG. 2 with the propellers folded. After the engine stops, as shown in FIG. 2, the blades 6a of the propellers 6 protrude from the airframe 5 to the right and left and forward and backward. By folding these blades inward, the overall dimensions of the unmanned aerial vehicle can be reduced. In FIG. 3, the blade 6a of the first propeller 1 and the blade 6a of the second propeller 2 are shown overlapping, and since the blades 6a are mounted at an angle, they do not actually collide. The folding of the propellers 6 is performed by a folding mechanism 13 (described later) located at the base of each blade 6a.

Figure 4:
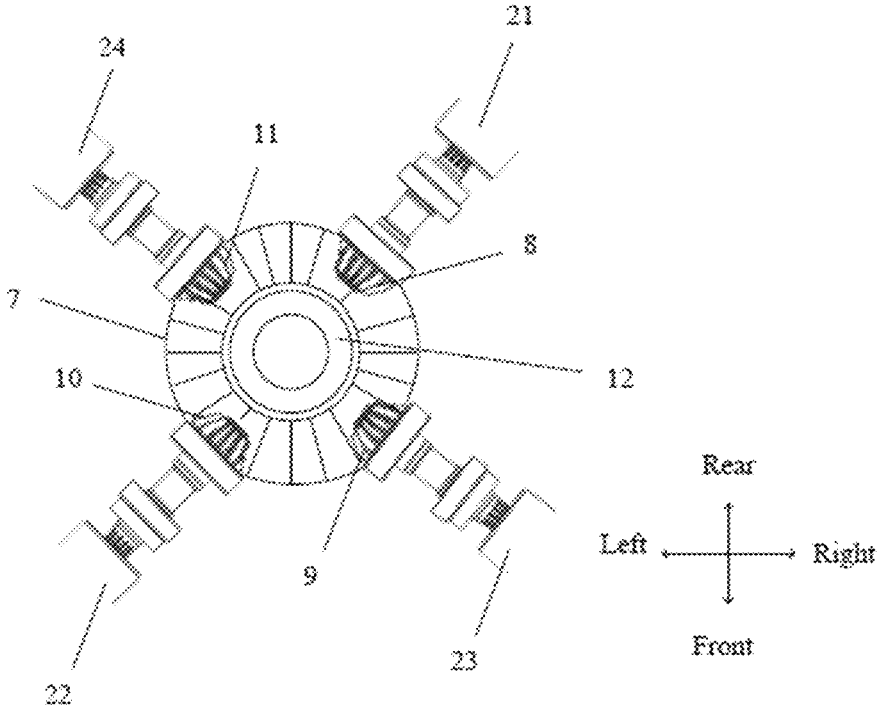
FIG. 4 is a plan view of a main bevel gear by which four propellers are driven.

FIG. 4 is a plan view of a main bevel gear 7 by which the four propellers 6 are driven. In this embodiment, the engine is a horizontal engine with the crankshaft oriented vertically. The drive shaft 12, which is connected to the crankshaft via a clutch, is also oriented vertically. The drive shaft 12 is equipped with the main bevel gear 7. The main bevel gear 7 meshes with a first sub bevel gear 8, a second sub bevel gear 9, a third sub bevel gear 10, and a fourth sub bevel gear 11. Each sub bevel gear transmits the engine's rotation to a first propeller shaft 21, a second propeller shaft 22, a third propeller shaft 23, and a fourth propeller shaft 24, respectively. If the main bevel gear 7 rotates clockwise in a top view; the first sub bevel gear 8, the second sub bevel gear 9, the third sub bevel gear 10, and the fourth sub bevel gear 11 all rotate counterclockwise when viewed from one end.

Figure 5:
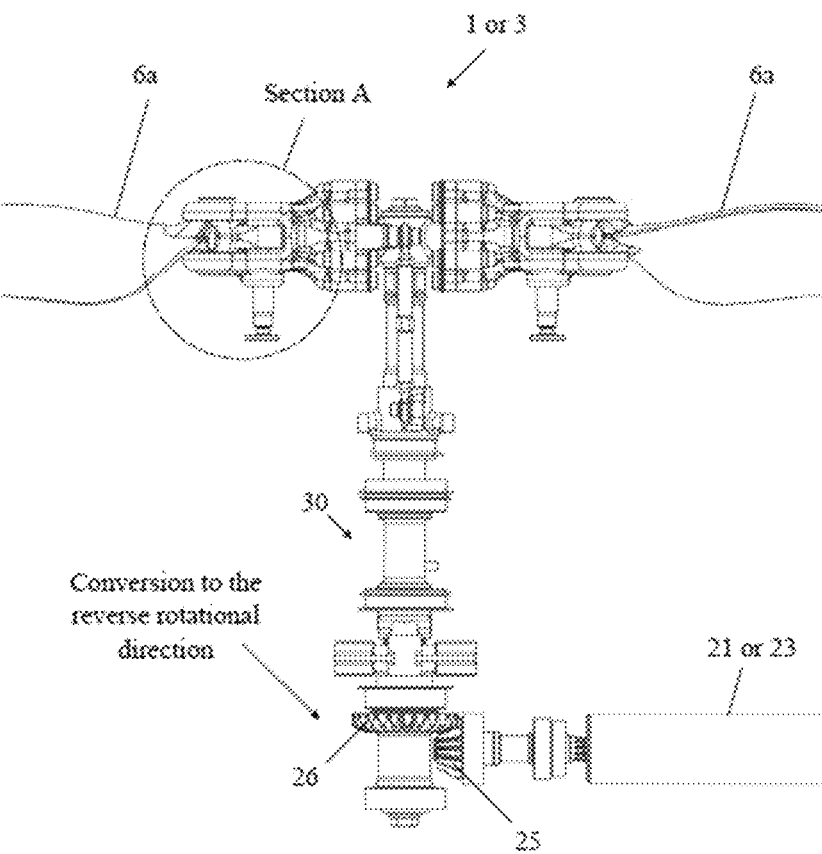
FIG. 5 is an internal structural view of a mechanism that drives first and third propellers.

FIG. 5 is an internal structural view of a mechanism that drives the first and third propellers. Both the mechanism for the first propeller 1 and the mechanism for the third propeller 3 have the same structure. As shown in FIG. 5, the rotation of the first propeller shaft 21 is converted into reverse rotation by two bevel gears 25 and 26, and transmitted to the vertical shaft 30. The rotation of the vertical shaft 30 is then transmitted to the blades 6a, 6a of the first propeller 1. As shown in FIG. 4, the first sub bevel gear 8 at one end of the first propeller shaft 21 rotates counterclockwise, so the bevel gear 25 at the other end of the first propeller shaft 21 in FIG. 5 rotates clockwise when viewed from the left side, and the bevel gear 26 on the vertical shaft 30 rotates counterclockwise when viewed from below: As a result, the first propeller I rotates clockwise when viewed from above (in a plan view).

Similarly, as shown in FIG. 5, the rotation of the third propeller shaft 23 is converted into reverse rotation by the two bevel gears 25 and 26, and transmitted to the vertical shaft 30. The rotation of the vertical shaft 30 is then transmitted to the blades 6a, 6a of the third propeller 3. As shown in FIG. 4, the third sub bevel gear 10 at one end of the third propeller shaft 23 rotates counterclockwise, so the bevel gear 25 at the other end of the first propeller shaft 23 in FIG. 5 rotates clockwise when viewed from the left side, and the bevel gear 26 on the vertical shaft 30 rotates counterclockwise when viewed from below: As a result, the third propeller 3 rotates clockwise when viewed from above (in a plan view).

Figure 6:
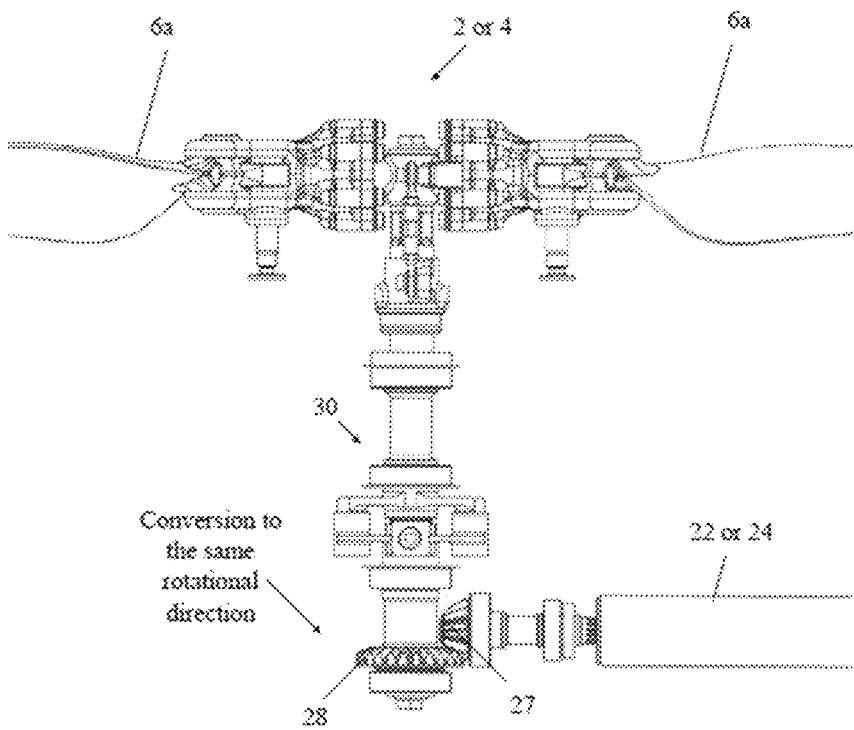
FIG. 6 is an internal structural view of a mechanism that drives second and fourth propellers.

FIG. 6 is an internal structural view of a mechanism that drives the second and fourth propellers. Both the mechanism for the second propeller 2 and the mechanism for the fourth propeller 4 have the same structure. The rotation of the second propeller shaft 22 is converted into the same direction by two bevel gears 27 and 28, and transmitted to the vertical shaft 30. The rotation of the vertical shaft 30 is then transmitted to the blades 6a, 6a of the second propeller 2. As shown in FIG. 4, the second sub bevel gear 9 at one end of the second propeller shaft 22 rotates counterclockwise, so the bevel gear 27 at the other end of the second propeller shaft 22 in FIG. 6 rotates clockwise, and the bevel gear 28 on the vertical shaft 30 rotates clockwise when viewed from below. As a result, the second propeller 2 rotates counterclockwise when viewed from above (in a plan view).

Referring to FIG. 6, the rotation of the fourth propeller shaft 24 is converted into the same direction by the two bevel gears 27 and 28, and transmitted to the vertical shaft 30. The rotation of the vertical shaft 30 is then transmitted to the blades 6a, 6a of the fourth propeller 4. As shown in FIG. 4, the fourth sub bevel gear 11 at one end of the fourth propeller shaft 24 rotates counterclockwise, so the bevel gear 27 at the other end of the fourth propeller shaft 24 in FIG. 6 rotates clockwise, and the bevel gear 28 on the vertical shaft 30 rotates clockwise when viewed from below: As a result, the fourth propeller 4 rotates counterclockwise when viewed from above (in a plan view). As shown in FIGS. 5 and 6, the vertical shafts 30 are of the same length, and the first propeller 1, the second propeller 2, the third propeller 3, and the fourth propeller 4 are all at the same height relative to the ends of their respective shafts.

Figure 7:
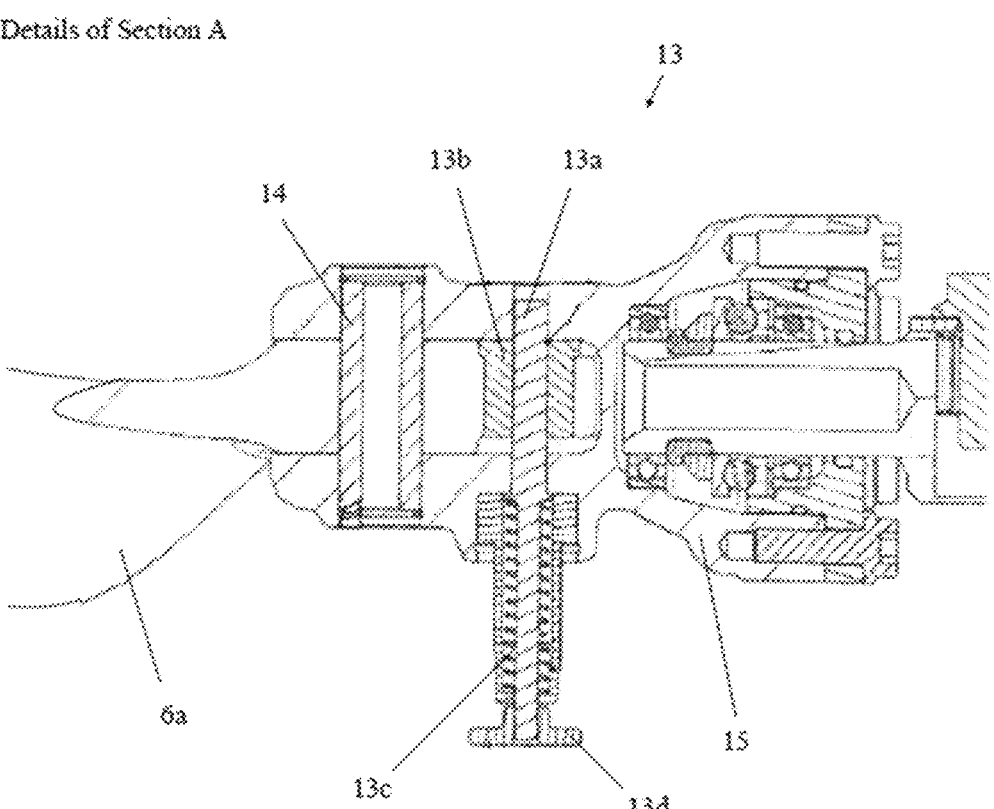
FIG. 7 is a detailed view of section A in FIG. 5, showing a folding mechanism of a blade.

FIG. 7 is a detailed view of section A in FIG. 5, showing a folding mechanism 13 of a blade 6a. As shown in FIG. 5, the folding mechanism 13 is provided at the base of the blade 6a. The folding mechanism 13 includes a pin 13a, a rubber damper 13b surrounding the pin 13a, a spring 13c, and a knob 13*d*. When the knob is manually pulled, the engagement between the pin 13*a* and the blade 6*a* is released, allowing the blade 6*a* to rotate around a rotational shaft 14. This allows the blade 6*a* to be rotated horizontally by 90 degrees. Providing the rubber damper 13*b* can mitigate the load applied to the pin 13*a* when the propeller starts rotating.

Industrial Applicability

The present invention is suitable for unmanned aerial vehicles because the propellers are configured to be foldable, have overlapping rotational ranges with adjacent propellers, and rotate in opposite directions. These features achieve uniform lift and reduce the overall dimensions of the aircraft.

Description of Reference Signs

1. First propeller
2. Second propeller
3. Third propeller
4. Fourth propeller
5. Airframe
6. Propeller
6*a*. Blade
7. Main bevel gear
8. First sub bevel gear
9. Second sub bevel gear
10. Third sub bevel gear
11. Fourth sub bevel gear
12. Drive shaft
13. Folding mechanism
13*a*. Pin

13*b*. Rubber damper
13*c*. Spring
13*d*. Knob
14. Rotational shaft
15. Propeller holder
21. First propeller shaft
22. Second propeller shaft
23. Third propeller shaft
24. Fourth propeller shaft
25, 26. Bevel gear
27, 28. Bevel gear
30. Vertical shaft
100. Unmanned aerial vehicle

The invention claimed is:

1. An unmanned aerial vehicle comprising: four propeller shafts arranged horizontally in a diagonal direction to extend from an airframe; four propellers, each comprising two blades with a folding mechanism; and gears that transmit the rotation of an engine to the propellers;

wherein the four propellers are all positioned at the same height relative to each end of the respective propeller shafts; wherein the adjacent propellers have overlapping rotational ranges; wherein the propellers are mounted at a 90° offset mounting angle from each adjacent propeller; wherein the adjacent propellers rotate in opposite directions; wherein the folding mechanism comprises a knob, a spring, a pin, and a rubber damper that surrounds the pin; wherein pulling the knob to release the engagement between the pin and the blade allows the blade to rotate around a rotational shaft; and wherein the pulled knob is released while the blade is rotated, the pin returns to its original position by the spring.

\* \* \* \* \*